(12) United States Patent
Lee et al.

(10) Patent No.: US 11,309,942 B1
(45) Date of Patent: Apr. 19, 2022

(54) RADAR HAVING ANTENNAS ARRANGED AT HORIZONTAL AND VERTICAL INTERVALS

(71) Applicant: BITSENSING INC., Seoul (KR)

(72) Inventors: Jae Eun Lee, Seoul (KR); Hae Seung Lim, Seongnam-si (KR)

(73) Assignee: BITSENSING INC., Seoul (KR)

( * ) Notice: Subject to any disclaimer, the term of this patent is extended or adjusted under 35 U.S.C. 154(b) by 0 days.

(21) Appl. No.: 17/139,150

(22) Filed: Dec. 31, 2020

(30) Foreign Application Priority Data

Dec. 28, 2020 (KR) .................. 10-2020-0184655

(51) Int. Cl.
*H04B 7/04* (2017.01)
*H04B 7/0417* (2017.01)
*H04B 7/0456* (2017.01)
*H01Q 1/24* (2006.01)

(52) U.S. Cl.
CPC ........... *H04B 7/0417* (2013.01); *H01Q 1/247* (2013.01); *H04B 7/046* (2013.01)

(58) Field of Classification Search
CPC ....... H04B 7/0417; H04B 7/046; H01Q 1/242
See application file for complete search history.

(56) References Cited

U.S. PATENT DOCUMENTS

2020/0256973 A1\* 8/2020 Kim .................. G01S 13/58

FOREIGN PATENT DOCUMENTS

| JP | H09162626 A | 6/1997 |
| KR | 1020190058072 A | 5/2019 |
| KR | 1020200001534 A | 1/2020 |
| KR | 1020200047411 A | 5/2020 |

\* cited by examiner

*Primary Examiner* — Curtis B Odom
(74) *Attorney, Agent, or Firm* — Dinsmore & Shohl LLP; Yongsok Choi, Esq.

(57) ABSTRACT

A radar includes a transmitter antenna unit including a plurality of transmitter antennas arranged in a diagonal direction based on a first horizontal interval and a first vertical interval, a receiver antenna unit including a first receiver antenna group and a second receiver antenna group arranged based on a second horizontal interval, a transceiver configured to transmit a transmission signal through the transmitter antenna unit and receive a reflection signal reflected from a target object through the receiver antenna unit and a processing unit configured to extract information about the target object by processing the received reflection signal.

10 Claims, 4 Drawing Sheets

*FIG. 1*
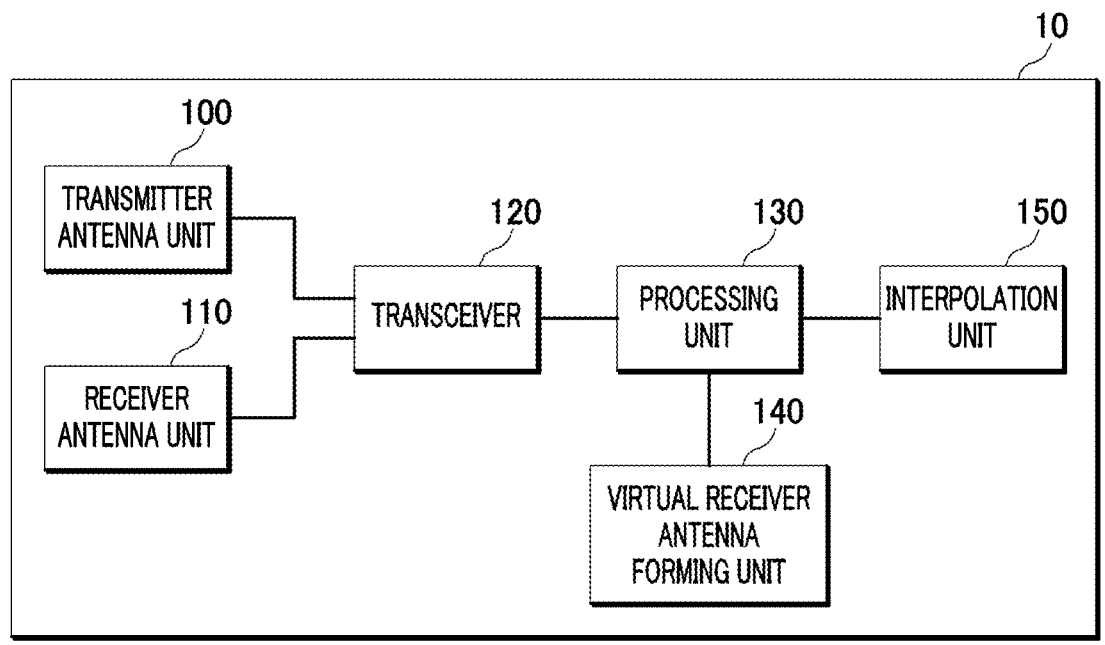
*FIG. 2A*  *FIG. 2B*
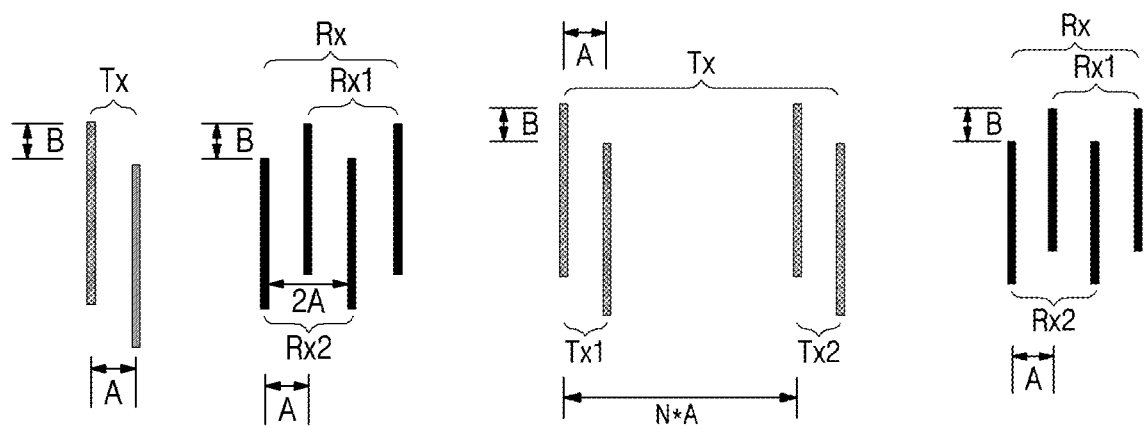

RADAR HAVING ANTENNAS ARRANGED AT HORIZONTAL AND VERTICAL INTERVALS

CROSS-REFERENCE TO RELATED APPLICATION

This application claims the benefit under 35 USC 119(a) of Korean Patent Application No. 10-2020-0184655 filed on 28 December, 2020, in the Korean Intellectual Property Office, the entire disclosures of which are incorporated herein by reference for all purposes.

TECHNICAL FIELD

The present disclosure relates to a radar having a plurality of antennas arranged at horizontal and vertical intervals.

BACKGROUND

In general, a radar needs to have high angular resolution to detect or track the distance, speed, and angle of a target device by transmitting and receiving electronic waves.

A conventional radar for a vehicle includes an antenna array arranged in parallel with an azimuth axis along a driving direction of the vehicle and thus can estimate the angle of an object on the road. However, since the antenna array is arranged in parallel with the azimuth axis, it is impossible to detect the angle of the object in an elevation direction.

In recent years, the radar has used an antenna pattern in which antennas are arranged in a horizontal direction to extract information for the elevation direction and antennas are additionally arranged in a vertical direction to detect a vertical angle.

However, when a horizontal angle and a vertical angle are measured separately, if there is a plurality of objects located in the same distance and moving at the same speed, it is ambiguous to distinguish the vertical angle and the horizontal angle.

To solve this problem, the radar needs to be configured in a two-dimensional array antenna (planar array) to simultaneously extract the vertical angle and the horizontal angle.

In general, a conventional two-dimensional array antenna uses a TR module having a transmitter antenna integrated with a receiver antenna. However, the TR module requires an expensive hardware resource and cannot be currently implemented at a high frequency of 77 GHz assigned to a vehicle.

SUMMARY

In view of the foregoing, the present disclosure provides a radar capable of improving angular resolution in horizontal and vertical directions for long-distance and near-field detection by efficiently arranging a plurality of transmitter antennas and a plurality of receiver antennas. The problems to be solved by the present disclosure are not limited to the above-described problems. There may be other problems to be solved by the present disclosure.

The technologies described and recited herein include a radar comprising a transmitter antenna unit including a plurality of transmitter antennas arranged in a diagonal direction based on a first horizontal interval and a first vertical interval, a receiver antenna unit including a first receiver antenna group and a second receiver antenna group arranged based on a second horizontal interval, a transceiver configured to transmit a transmission signal through the transmitter antenna unit and receive a reflection signal reflected from a target object through the receiver antenna unit and a processing unit configured to extract information about the target object by processing the received reflection signal.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described embodiments of the present disclosure, it is possible to improve angular resolution in horizontal and vertical directions for long-distance and near-field detection by efficiently arranging a plurality of transmitter antennas and a plurality of receiver antennas.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1 is a block diagram illustrating the configuration of a radar in accordance with an embodiment of the present disclosure.

FIG. 2A illustrates an array configuration of antennas included in the radar in accordance with an embodiment of the present disclosure.

FIG. 2B illustrates an array configuration of antennas included in the radar in accordance with an embodiment of the present disclosure.

DETAILED DESCRIPTION

Figure 3A:
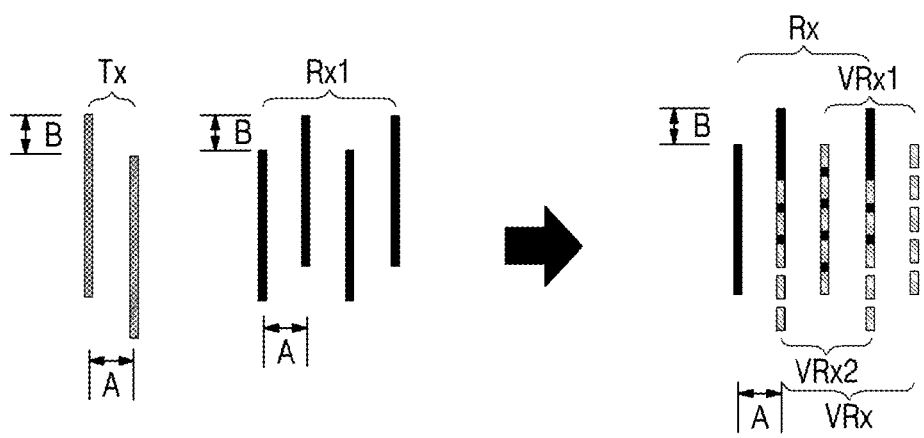
FIG. 3A shows an equivalent state diagram depending on the antenna array configuration in accordance with an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowcharts.

FIG. 1 is a block diagram illustrating the configuration of a radar 10 in accordance with an embodiment of the present disclosure. Referring to FIG. 1, the radar 10 may include a transmitter antenna unit 100, a receiver antenna unit 110, a transceiver 120, a processing unit 130 and a virtual receiver antenna forming unit 140.

FIG. 2A illustrates a first example of an array configuration of antennas included in the radar, and FIG. 2B illustrates a second example of an array configuration of antennas included in the radar.

The radar 10 may be installed at a specific position of a vehicle and may transmit a transmission signal through the transmitter antenna unit 100 and receive a reception signal reflected and returning from a target object around the vehicle through the receiver antenna unit 110 to detect the presence or absence, position, direction, speed or size of the target object.

The radar 10 may use the detection result of the target object to avoid a collision with a vehicle ahead or safely change lanes and thus can accurately control a vehicle system.

The transmitter antenna unit 100 may include a plurality of transmitter antennas for transmitting a transmission signal to detect the target object.

Referring to FIG. 2A, the transmitter antenna unit 100 may include at least two transmitter antenna groups. Here, each transmitter antenna group may include a plurality of transmitter antennas Tx arranged at a first horizontal interval and a first vertical interval or arranged in a diagonal direction based on the first horizontal interval and the first vertical interval. For example, a first horizontal interval A and a first vertical interval B may be set to the same value (for example, 0.5 lambda).

Referring to FIG. 2B, the transmitter antenna unit 100 may include at least two transmitter antenna groups Tx1 and Tx2 arranged at the first horizontal interval A and the first vertical interval B in the diagonal direction. Here, the at least two transmitter antenna groups Tx1 and Tx2 may be arranged at an interval from each other based on the number of receiver antennas Rx1 and Rx2 included in the receiver antenna unit 110 and the first horizontal interval A. For example, an interval between the transmitter antenna groups Tx1 and Tx2 may be calculated based on Equation 1.

$$\text{Interval between transmitter antenna groups} = N*A \quad \text{[Equation 1]}$$

Herein, N represents the number of receiver antennas included in the receiver antenna unit 110 and A represents the first horizontal interval.

Referring to FIG. 2A and FIG. 2B, the receiver antenna unit 110 may include a plurality of receiver antennas for receiving a reception signal reflected and returning from the target object around the vehicle based on a transmission signal transmitted from the transmitter antenna unit 100.

The receiver antenna unit 110 may include a first receiver antenna group Rx1 and a second receiver antenna group Rx2 arranged in parallel with each other in a horizontal direction at a second horizontal interval 2*A or based on the second horizontal interval 2*A. That is, a plurality of receiver antennas included in the first receiver antenna group Rx1 may be arranged at the second horizontal interval 2*A in the horizontal direction and a plurality of receiver antennas included in the second receiver antenna group Rx2 may be arranged at the second horizontal interval 2*A in the horizontal direction.

Here, the second horizontal interval 2*A may be at least double of the first horizontal interval A.

For example, if the number of the plurality of receiver antennas included in the receiver antenna unit 110 is four, the first receiver antenna group Rx1 may be composed of two receiver antennas and the second receiver antenna group Rx2 may be composed of two receiver antennas.

At least one receiver antenna included in the first receiver antenna group Rx1 and at least one receiver antenna included in the second receiver antenna group Rx2 may be alternately arranged. That is, the receiver antennas in the first receiver antenna group Rx1 and the receiver antennas in the second receiver antenna group Rx2 may be arranged in a regular zigzag pattern.

Here, a receiver antenna of the first receiver antenna group Rx1 and a receiver antenna of the second receiver antenna group Rx2 arranged adjacent to each other may be arranged based on the first horizontal interval A in the horizontal direction.

A receiver antenna of the first receiver antenna group Rx1 and a receiver antenna of the second receiver antenna group Rx2 may be arranged adjacent to each other at the first horizontal interval A.

A receiver antenna of the first receiver antenna group Rx1 and a receiver antenna of the second receiver antenna group Rx2 arranged adjacent to each other may be arranged to have a vertical offset based on a second vertical interval B. For example, the second vertical interval may be equal to the first vertical interval.

In the above-described antenna array pattern of the radar 10, the transmitter antenna unit 100 and the receiver antenna unit 110 can be arranged not to overlap with each other.

If multiple-input and multiple-output (MIMO) operations are performed through the antenna array configuration shown in FIG. 2A and FIG. 2B, a planar antenna array configured as a series of triangular lattices can be formed. If a MIMO virtual array is implemented using the antenna array configuration shown in FIG. 2A and FIG. 2B, a planar antenna array configuration can be formed. In the planar antenna array configuration, angles of the target object in the vertical direction and the horizontal direction can be simultaneously detected. If the radar 10 is configured by extending the transmitter antenna unit 100 as shown in FIG. 2B, it is possible to reduce the beam width.

The transceiver 120 may transmit a transmission signal through the transmitter antenna unit 100 and receive a reflection signal reflected from the target object through the receiver antenna unit 110. For example, the transceiver 120 may transmit transmission signals rapidly at regular intervals through the transmitter antenna unit 100 by a first transmission method (for example, fast-chirp TDMA method) and receive reflection signals reflected from the target object through the receiver antenna unit 110.

Figure 4:
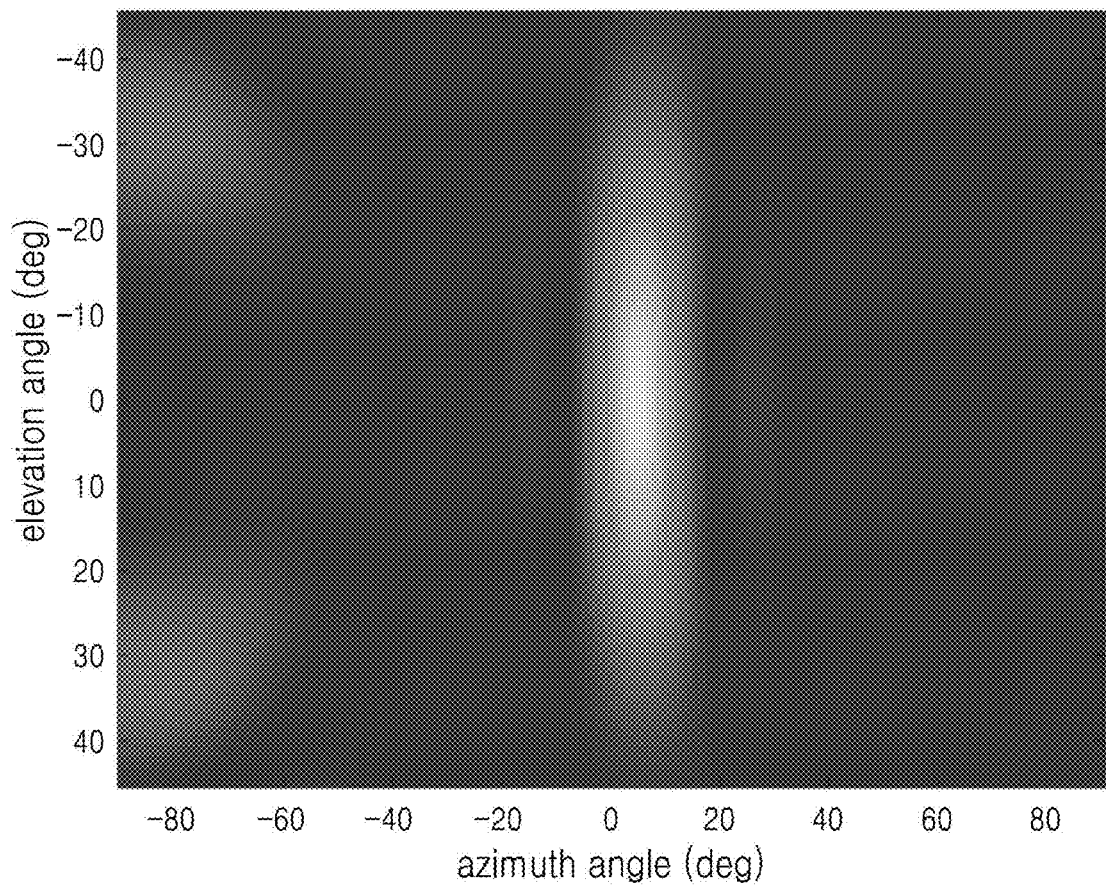
FIG. 4 shows the result of detecting verticality by the radar in accordance with an embodiment of the present disclosure.

The processing unit 130 may extract information about the target object by processing the reflection signals reflected from the target object. For example, the processing unit 130 may obtain, from the received reflection signals, vertical information, such as the height of the target object, and horizontal information, such as the width of the target object. For example, referring to FIG. 4, the processing unit 130 may estimate an azimuth angle and an elevation angle of the target object from the position with the highest intensity of a reflection signal.

When the processing unit 130 performs MIMO operations through a plurality of transmitter antennas included in the transmitter antenna unit 100, the virtual receiver antenna forming unit 140 may form virtual receiver antennas arranged at a predetermined horizontal interval in the same horizontal direction as a plurality of receiver antennas included in the receiver antenna unit 110.

Figure 3B:
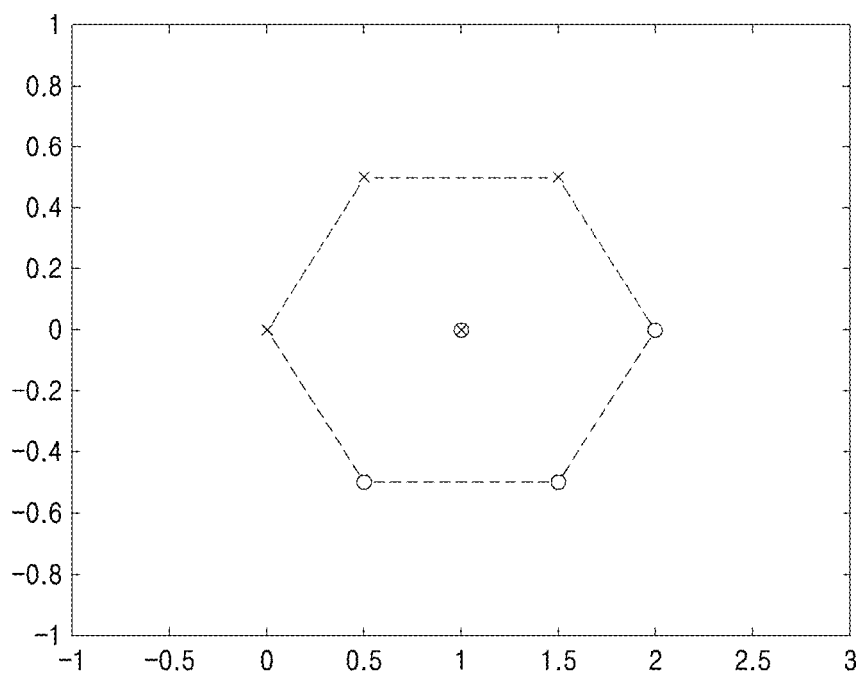
FIG. 3B shows a virtual array pattern in accordance with an embodiment of the present disclosure.
Figure 3C:
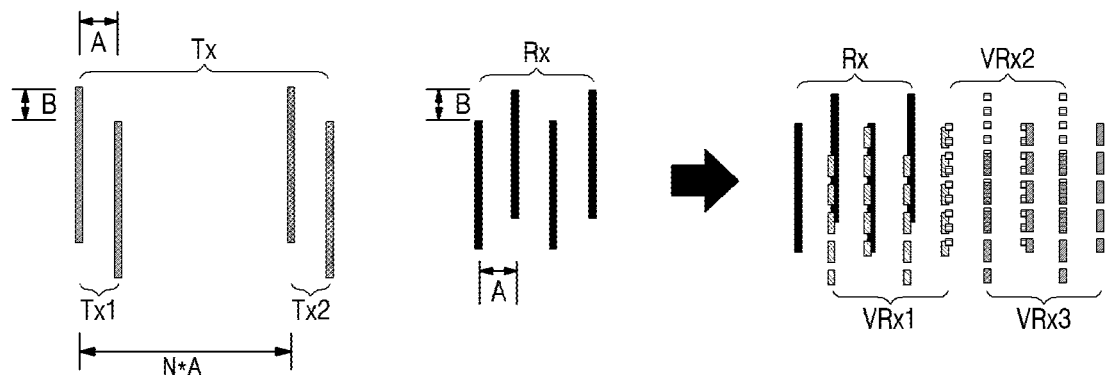
FIG. 3C shows an equivalent state diagram depending on the antenna array configuration in accordance with an embodiment of the present disclosure.

FIG. 3A illustrates equivalent state diagram depending on the antenna array configuration of FIG. 2A and FIG. 3C illustrates equivalent state diagram depending on the antenna array configuration of FIG. 2B.

Referring to FIG. 3A, when a plurality of transmitter antennas Tx arranged at the first horizontal interval and the first vertical interval performs MIMO operations, the virtual receiver antenna forming unit 140 may form a virtual receiver antenna unit VRx including a first virtual receiver antenna group VRx1 and a second virtual receiver antenna group VRx2 arranged at the second horizontal interval so as to correspond to each of the plurality of transmitter antennas Tx.

Referring to FIG. 3C, when a first transmitter antenna group Tx1 and a second transmitter antenna group Tx2 arranged at the first horizontal interval and the first vertical interval perform MIMO operations, the virtual receiver antenna forming unit 140 may form a virtual receiver antenna unit VRx including a first virtual receiver antenna group VRx1, a second virtual receiver antenna group VRx2 and a third virtual receiver antenna group VRx3 arranged at the second horizontal interval in the same horizontal direction as each of the first receiver antenna group Rx1 and the second receiver antenna group Rx2 so as to correspond to each of the first transmitter antenna group Tx1 and the second transmitter antenna group Tx2.

When the first transmitter antenna Tx1 and the second transmitter antenna Tx2 transmit identical transmission signals at the same time, receiver antennas configured to receive reception signals reflected and returning from the target object based on the transmission signals can have the same effect as if they were spatially shifted by a predetermined horizontal interval (i.e., interval N*A between the first transmitter antenna Tx1 and the second transmitter antenna Tx2) in the horizontal direction and received the identical reception signals. The receiver antennas formed at the shifted positions may be referred to as virtual receiver antennas VRx.

That is, a first virtual receiver antenna VRx1 may be formed at a position shifted by the predetermined horizontal interval from a first receiver antenna Rx1 and a second virtual receiver antenna VRx2 may be formed at a position shifted by the predetermined horizontal interval from a second receiver antenna Rx2.

Here, the first virtual receiver antenna VRx1 and the second virtual receiver antenna VRx2 formed in the same horizontal direction as the first receiver antenna Rx1 and the second receiver antenna Rx2 may have a vertical offset at the second vertical interval so as to correspond to the first receiver antenna Rx1 and the second receiver antenna Rx2.

Accordingly, the first receiver antenna Rx1, the second receiver antenna Rx2, the first virtual receiver antenna VRx1 and the second virtual receiver antenna VRx2 are formed at a receiver end, and, thus, an extended aperture doubled in horizontal area can be secured. Therefore, it is possible to precisely measure horizontal information about the target object in a long distance and also possible to improve the resolution of the horizontal information and improve the level of a side lobe.

When MIMO operations of an imaging radar are configured, a uniform linear array is applied to the antenna array configuration of the present disclosure. Thus, it is possible to improve the level of a side lobe.

Further, according to the present disclosure, it is possible to detect the target object through a plurality of receiver antennas Rx1 and Rx2 and a plurality of virtual receiver antennas VRx1 and VRx2 having a vertical offset and also possible to detect and estimate a vertical angle of the target object using a phase difference.

Referring to FIG. 3A and FIG. 3C, if at least one receiver antenna of the first receiver antenna group Rx1 and the second receiver antenna group Rx2 and at least one virtual receiver antenna of the first virtual receiver antenna group VRx1 and the second virtual receiver antenna group VRx2 overlap with each other, the processing unit 130 may perform error compensation on a received reflection signal based on signals received by the receiver antenna and the virtual receiver antenna overlapping with each other.

Figure 3D:
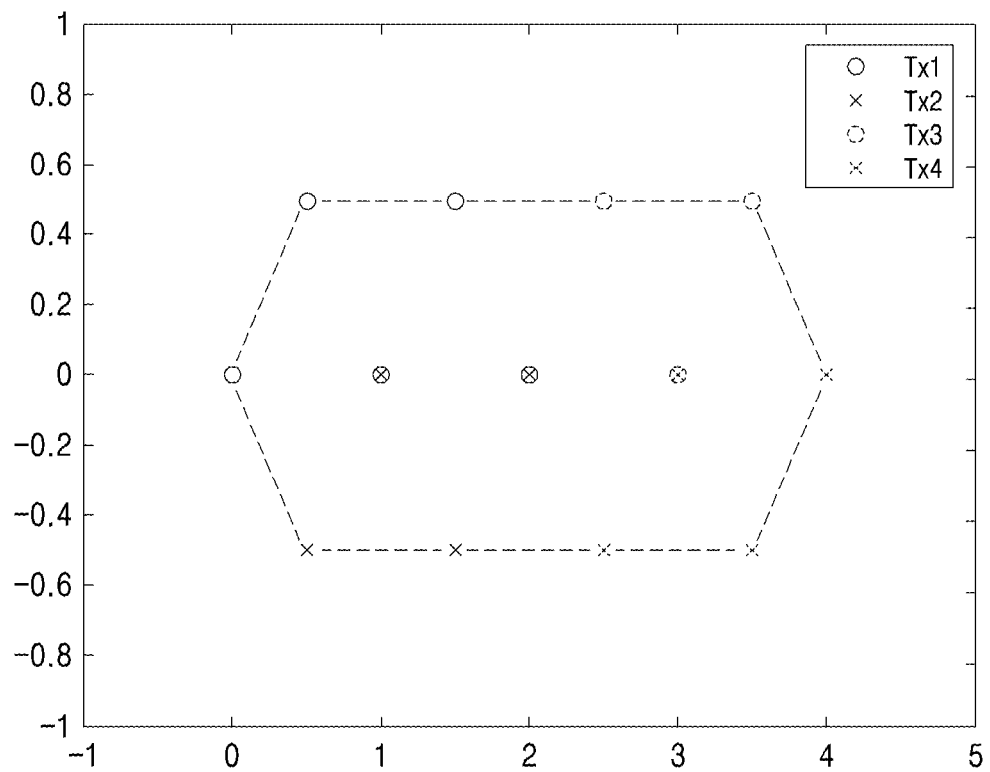
FIG. 3D shows a virtual array pattern in accordance with an embodiment of the present disclosure.

FIG. 3B illustrates an antenna pattern formed according to the antenna array configuration of FIG. 2A and FIG. 3D illustrates an antenna pattern formed according to the antenna array configuration of FIG. 2B.

Referring to FIG. 3B and FIG. 3D, a hexagonal antenna pattern may be formed within a horizontal area and a vertical area corresponding to the first receiver antenna group Rx1, the second receiver antenna group Rx2, the first virtual receiver antenna group VRx1 and the second virtual receiver antenna group VRx2.

An interpolation unit 150 may form an antenna pattern arranged in the form of a triangle in LaTex within a horizontal area and a vertical area corresponding to the plurality of receiver antennas and the plurality of virtual receiver antennas by applying MIMO virtual array interpolation to the plurality of receiver antennas and the plurality of virtual receiver antennas. By applying the MIMO virtual array interpolation to the plurality of receiver antennas, the interpolation unit 150 can obtain the maximum radiation aperture with a limited number of receiver channels.

Herein, it is possible to extract a spatial relative distance between a transmitter antenna and a receiver antenna by using the MIMO virtual array interpolation, extract a frequency component signal depending on the distance to the target object and a change in speed of the target object by performing a two dimensional fast Fourier transform on an actually received reception signal and infer a signal of a non-existing virtual antenna from the extracted frequency component signal by using information about power and phase of a frequency of the target object.

Figure 5:
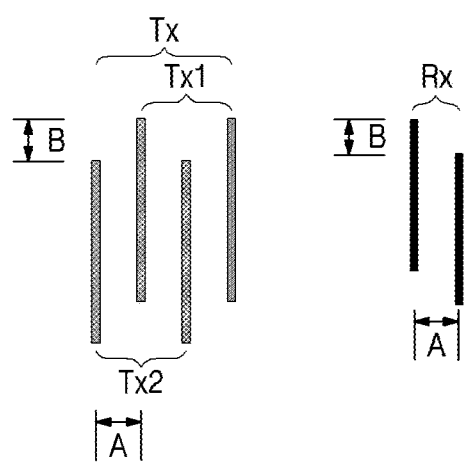
FIG. 5 illustrates an array configuration of antennas included in the radar in accordance with another embodiment of the present disclosure.

FIG. 5 illustrates a third example of an array configuration of a plurality of transmitter antennas and a plurality of receiver antennas of an antenna device included in the radar 10. Herein, FIG. 5 illustrates an antenna array configuration changed from the array of the plurality of transmitter antennas included in the transmitter antenna unit 100 and the plurality of receiver antennas included in the receiver antenna unit 110 shown in FIG. 2A.

The third example of the antenna array configuration shown in FIG. 5 has an array of transmitter antennas and an array of receiver antennas which are reversed from those in the first example of the antenna array configuration shown in FIG. 2A. That is, the array of transmitter antennas in the first example may correspond in pattern to the array of transmitter antennas in the third example, and the array of receiver antennas in the first example may correspond in pattern to the array of receiver antennas in the third example. As such, the present disclosure suggests an antenna array configuration that can be used for both transmitter antennas and receiver antennas. Therefore, an antenna array configuration and a signal processing operation of the third example can be performed as in the first example with reference to the above-described antenna array configuration and operation of the first example.

Referring to FIG. 5, the transmitter antenna unit 100 may include the first transmitter antenna group Tx1 and the second transmitter antenna group Tx2 arranged based on the first horizontal vertical 2*A. Here, transmitter antennas included in the first transmitter antenna group Tx1 and transmitter antennas included in the second transmitter antenna group Tx2 may be alternately arranged at the second horizontal interval A from each other. For example, the first horizontal interval 2*A may be at least double of the second horizontal interval A.

A transmitter antenna of the first transmitter antenna group Tx1 and a transmitter antenna of the second transmitter antenna group Tx2 arranged adjacent to each other may be arranged based on the second horizontal interval.

The transmitter antenna of the first transmitter antenna group Tx1 and the transmitter antenna of the second transmitter antenna group Tx2 arranged adjacent to each other may be arranged to have a vertical offset based on the first vertical interval B.

The receiver antenna unit 110 may include a plurality of receiver antennas Rx arranged in the diagonal direction based on the second horizontal interval A and the first vertical interval B.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A radar, comprising:
 a transmitter antenna unit including a plurality of transmitter antennas arranged in a diagonal direction based on a first horizontal interval and a first vertical interval;
 a receiver antenna unit including a first receiver antenna group and a second receiver antenna group arranged based on a second horizontal interval;
 a transceiver configured to transmit a transmission signal through the transmitter antenna unit and receive a reflection signal reflected from a target object through the receiver antenna unit; and
 a processing unit configured to extract information about the target object by processing the received reflection signal.

2. The radar of claim 1,
 wherein the transmitter antenna unit includes at least two transmitter antenna groups and each of the transmitter antenna groups includes a plurality of transmitter antennas arranged in the diagonal direction based on the first horizontal interval and the first vertical interval, and
 transmitter antenna groups respectively included in the at least two transmitter antenna groups are arranged at an interval from each other based on the number of receiver antennas included in the receiver antenna unit and the first horizontal interval.

3. The radar of claim 1, further comprising:
 a virtual receiver antenna forming unit configured to form a first virtual receiver antenna group and a second virtual receiver antenna group arranged at the second horizontal interval and corresponding to each of the plurality of transmitter antennas arranged at the first horizontal interval and the first vertical interval when multiple-input and multiple-output (MIMO) operations are performed through the plurality of transmitter antennas.

4. The radar of claim 3,
 wherein if at least one receiver antenna of the first receiver antenna group and the second receiver antenna group and at least one virtual receiver antenna of the first virtual receiver antenna group and the second virtual receiver antenna group overlap with each other, the processing unit performs error compensation on the received reflection signal based on signals received by the receiver antenna and the virtual receiver antenna overlapping with each other.

5. The radar of claim 3,
 wherein a hexagonal antenna pattern is formed within a horizontal area and a vertical area corresponding to the first receiver antenna group, the second receiver antenna group, the first virtual receiver antenna group and the second virtual receiver antenna group.

6. The radar of claim 1,
wherein at least one receiver antenna included in the first receiver antenna group and at least one receiver antenna included in the second receiver antenna group are alternately arranged.

7. The radar of claim 6,
wherein the receiver antenna included in the first receiver antenna group and the receiver antenna included in the second receiver antenna group are arranged adjacent to each other at the first horizontal interval.

8. The radar of claim 7,
wherein the second horizontal interval is at least double of the first horizontal interval.

9. The radar of claim 6,
wherein the receiver antenna included in the first receiver antenna group and the receiver antenna included in the second receiver antenna group are arranged adjacent to each other to have a vertical offset based on a second vertical interval.

10. The radar of claim 9,
wherein the first vertical interval is equal to the second vertical interval.

* * * * *